United States Patent [19]

Scorsiroli

[11] Patent Number: 4,750,235
[45] Date of Patent: Jun. 14, 1988

[54] WIPER ARM WITH HELICAL TORSION SPRING

[75] Inventor: Marcello Scorsiroli, Turin, Italy

[73] Assignee: Champion Spark Plug Italiana S.p.A., Druento, Italy

[21] Appl. No.: 46,270

[22] Filed: May 5, 1987

[30] Foreign Application Priority Data

May 8, 1986 [IT] Italy .............................. 53371/86[U]

[51] Int. Cl.⁴ .............................................. B60S 1/34
[52] U.S. Cl. ............................... 15/250.20; 15/250.34; 15/250.35
[58] Field of Search ........... 15/250.35, 250.34, 250.20, 15/250.19

[56] References Cited

U.S. PATENT DOCUMENTS

| | | | |
|---|---|---|---|
| 2,312,278 | 2/1943 | Zaiger | 15/250.35 |
| 2,312,279 | 2/1943 | Zaiger | 15/250.35 |
| 2,752,626 | 7/1956 | Oishei | 15/250.35 |

FOREIGN PATENT DOCUMENTS

| | | |
|---|---|---|
| 3149034 | 12/1981 | Fed. Rep. of Germany . |
| 2490564 | 10/1980 | France . |
| 856157 | 12/1960 | United Kingdom ............ 15/250.35 |
| 1150101 | 4/1969 | United Kingdom . |

*Primary Examiner*—Peter Feldman
*Attorney, Agent, or Firm*—Wood, Dalton, Phillips, Mason & Rowe

[57] ABSTRACT

The invention relates to a simplified wiper arm for motor vehicles. It comprises only a channel (1), an arm extension (2), a mounting head (3), a helical spring (4) and a rivet (5) acting as articulation means between the channel (1) and the mounting head (3). The mounting head (3) is secured to the drive shaft (7) in the area (6) located beteewn the arm extension (2) and the helical spring (4). The geometrical axis of the helical spring (4) extends substantially perpendicularly to the geometrical axis of the drive shaft (7). One of the extremities (4b) of the helical spring (4) exerts a pressure or load on the channel (1) and on the arm extension (2) via a protruding tongue (1a') provided on the channel (1).

6 Claims, 2 Drawing Sheets

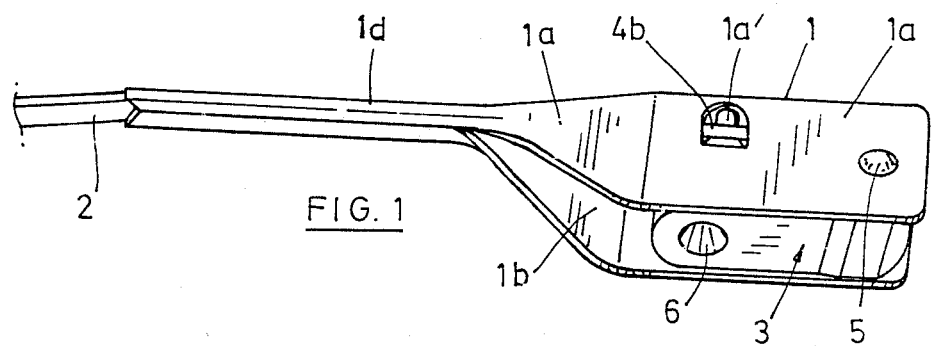
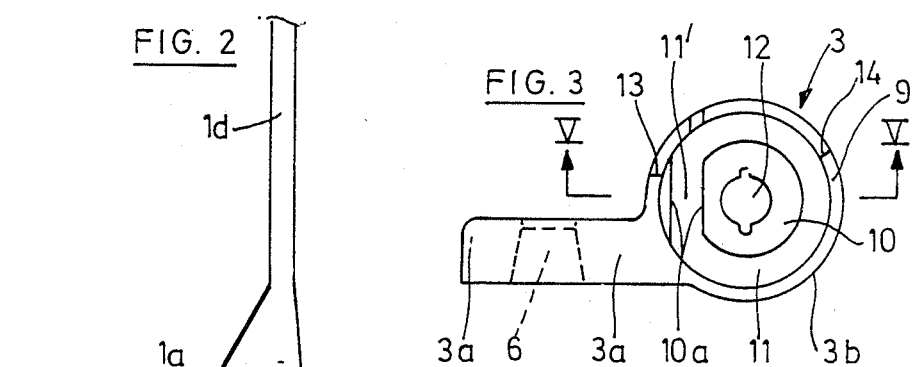
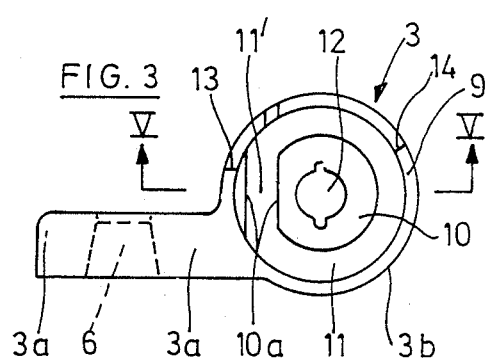
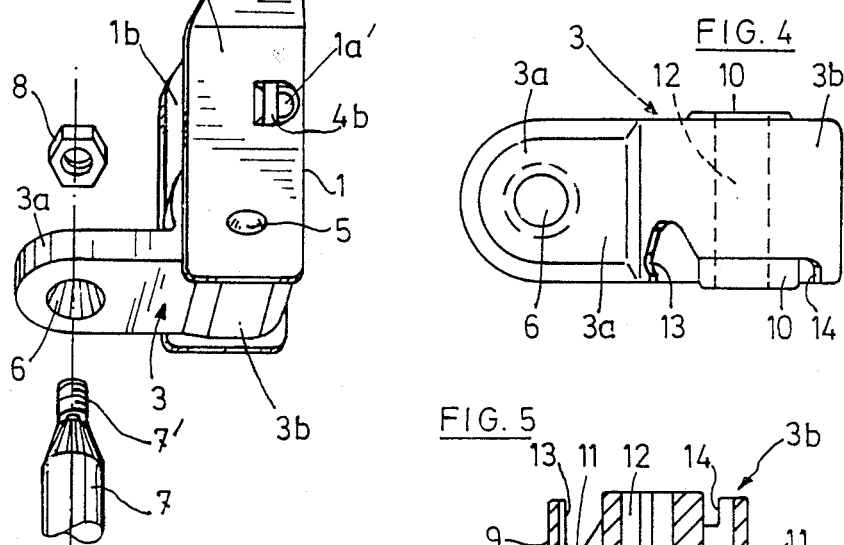
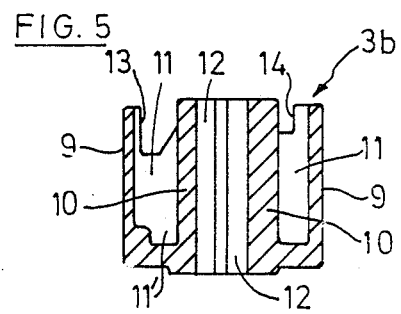

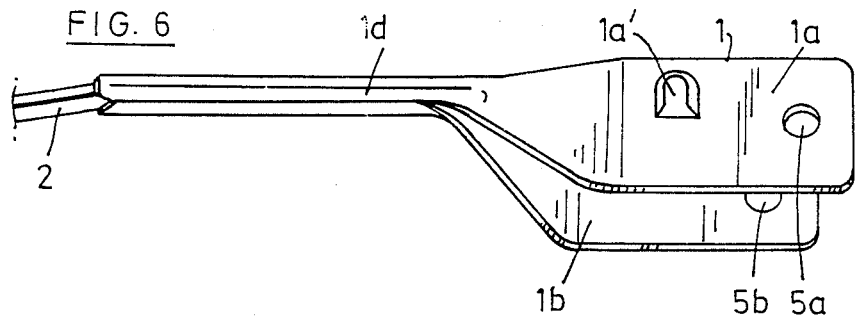
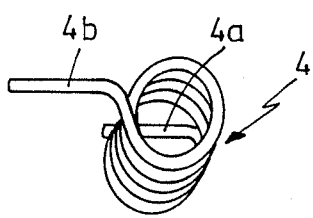
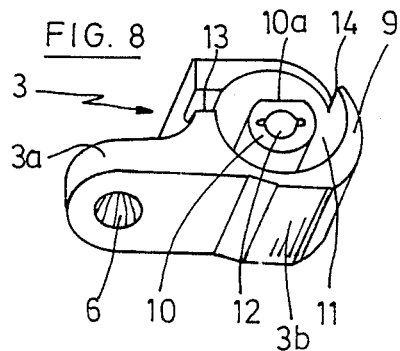
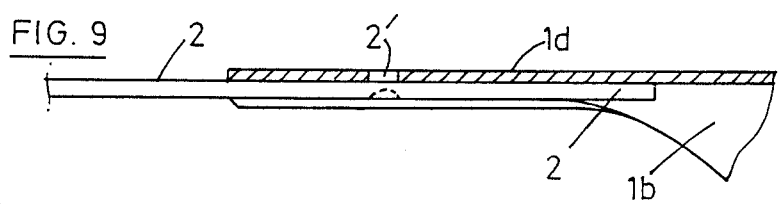
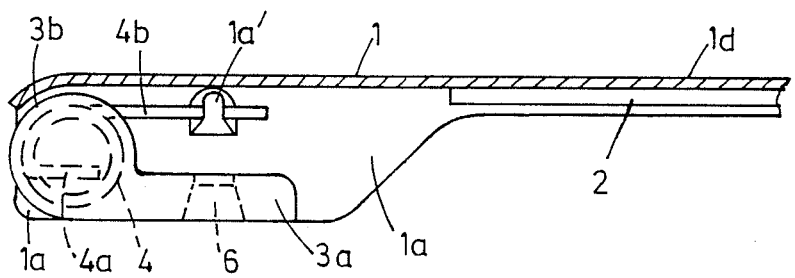

WIPER ARM WITH HELICAL TORSION SPRING

The present invention relates to a wiper arm for wiper blades of motor vehicles or the like, comprising a channel, an arm extension, a mounting head, a helical spring and a rivet acting as articulation means between the channel and the mounting head, wherein the mounting head is secured to a drive shaft which imparts an oscillating movement to the arm/blade assembly.

Most of the wiper arms known in prior art are provided with helical springs which urge the arm extension, and consequently the wiper blade, towards the surface to be wiped in acting either by traction or by compression. However wiper arms provided with a helical spring which acts by torsion are also known in prior art and in particular through for example French patent application No. 2,490,564 and German patent application No. 3,149,034. The wiper arm according to the invention belongs to the last mentioned category of arms.

The wiper arms known in prior art and provided with a helical spring acting by traction, compression or torsion have the disadvantage of being rather complicated because of the many elements which are necessary for their good working, thus implying very often difficult mounting operations and a relatively high costs.

The known wiper arms generally comprise a minimum of 8 to 10 different elements, while the wiper arm according to the invention only comprises 5 different elements. The reduction of the number of elements which constitute the wiper arm according to the invention is mainly due to a judicious assembly of the helical spring with respect to the other elements of the wiper arm.

The object of the invention is thus to provide a wiper arm of which the number of elements is reduced to a minimum and which consequently will be a wiper arm which is substantially less expensive than the wiper arms known in prior art.

The wiper arm according to the invention is substantially characterized by the fact that the mounting head is secured to the drive shaft in the area located between the arm extension and the helical spring and that the geometrical axis of the helical spring extends substantially perpendicularly to the geometrical axis of the drive shaft.

Another feature of the wiper arm according to the invention is the fact that, depending on the embodiment, the geometrical axis of the helical spring is either parallel to the geometrical axis of the mentioned rivet or corresponds to the geometrical axis of said rivet.

Other features and advantages of the wiper arm according to the invention will be better understood when reading the following portions of the description in conjunction with the appended drawings wherein:

FIG. 1 is a perspective view of the wiper arm according to the invention, the arm being in its rest position, FIG. 2 is a perspective view of the wiper arm according to the invention, the arm being in its mounting position, FIG. 3 is an elevational view, at a somewhat larger scale, of the mounting head according to the invention, FIG. 4 is a top view of the mounting head of FIG. 3, FIG. 5 is a sectional view, along line V—V, of the mounting head of FIG. 3, FIG. 6 is a perspective view of the channel and of the arm extension of the wiper arm according to the invention, FIG. 7 is a perspective view of the helical spring according to the invention, FIG. 8 is a perspective view of the mounting head according to the invention, FIG. 9 is a longitudinal, partial sectional view of the channel and of the arm extension according to the invention, and FIG. 10 is a longitudinal, partial sectional view of the wiper arm according to the invention.

FIG. 1 and FIG. 10 show that the wiper arm according to the invention comprises only the following five elements: the channel 1, the arm extension 2, the mounting head 3, the helical spring 4 and the rivet 5. In the area of the mounting head 3 the channel 1 has substentially the form of an inverted U and consequently comprises a web and two side walls 1a, 1b. In the rear(1d) of the arm extension 2 the lateral walls of the channel 1 are bent around said arm extension 2. As known by the man of the art the wiper blade is rotatably attached to the free end (not shown) of the arm extension 2.

As shown in FIG. 2, when compared to FIG. 1, the channel 1 can rotate about the rivet 5, or in other words the channel 1 can rotate with respect to the mounting head 3. In FIG. 2 the wiper arm according to the invention is in the position wherein it must be placed when it is being mounted onto the drive shaft 7, 7' of a motor vehicle.

When mounting the wiper arm according to the invention onto the drive shaft 7, 7' the upper portion of said drive shaft 7, 7' is inserted into the opening 6 provided in the mounting head 3 and is attached thereto by means of the nut 8. The channel 1 is then repushed into the position it has in FIG. 1.

It is to be noted that the channel 1 completely covers the upper portion of the drive shaft 7, 7' as well as the nut 8 by means of which the drive shaft 7, 7' is attached to the mounting head 3. This is a substantial advantage since to the contrary of the wiper arms known in prior art, the wiper arm according to the invention does not need a special and separate cap for covering said upper portion of the drive shaft 7, 7' and the nut 8.

FIG. 3, 4, 5 and 8 show the mounting head 3 which comprises a substantially flat portion 3a and a substantially cylindrical portion 3b. The flat portion 3a is provided with the opening 6 which receives the upper portion of the drive shaft 7, 7'. The cylindrical portion 3b is provided with a substantially annular recess 11 into which is inserted the helical spring according to the invention, helical spring 4 which is shown in a perspective view in FIG. 7.

The helical spring 4 comprises a first substantially rectilinear extremity 4a which, when said spring 4 is being inserted into the annular recess 11 enters into the rectilinear recess 11' in the bottom of the annular recess 11. The lateral walls 10a (FIG. 3) of the recess 11' being flat they lock the rectilinear extremity 4a of the helical spring 4 in the annular recess 11 of the mounting head 3. In other words, the helical spring 4 cannot rotate inside the annular recess 11 of the mounting head 3. It is to be noted that the orientation of the rectilinear recess 11' with respect to the portion 3a of the mounting head 3 is indifferent.

The central portion 10 of the annular recess 11 (or the portion 3b of the mounting head 3) comprises a bore 12 for receiving the rivet 5 about which the channel 1 of the wiper arm can rotate. Said rivet 5 is however not necessarily located inside the central portion 10 of the portion 3b of the mounting head 3 (or inside the helical spring 4).

The rivet 5 could just as well work in a bore loaded in another area of the mouting head 3 than the portion 3b. In this case the geometrical axis of the helical spring and of the rivet 5 would no longer coincide, but would extend substantially parallel to each other.

The second extremity 4b of the helical spring 4 is also rectilinear and, as will be explained hereunder, pushes the channel 1, and consequently the arm extension 2 and the wiper blade (not shown) towards the surface to be wiped.

On the external wall 9 of the portion 3b of the mounting head 3 two stops 13, 14 are provided for said second rectilinear extremity 4b. When the wiper arm is not loaded, i.e. when it is not mounted on a vehicle, the extremity 4 of the spring 4 rests on the stop 13, the stop 14 being only used for limiting the rotation of the extremity 4b of the spring 4 when the channel 1 is lifted with respect to the portion 3a of the mounting head 3 (FIG. 2).

On FIG. 6 only the channel 1 and the arm extension 2 are represented. The lateral walls 1a, 1b of the channel 1 are provided respectively with the circular openings 5a, 5b into which the rivet 5 is inserted (FIG. 1). The lateral wall 1a of the channel 1 comprises a tongue 1a' cut out of said wall 1a and slightly projecting towards the interior of the channel 1.

The assembly of the wiper arm according to the invention is executed as follows:

(a) the helical spring 4 is inserted into the annular opening 11 of the mounting head 3, (b) the rectilinear extremity 4b of the helical spring 4 is rotated clockwise by for example one turn and is then locked behind the stop 13, (c) the assembly mounting head/helical spring is inserted from the right-hand side (FIG. 6) into the channel 1 so that the rectilinear extremity 4b of the spring 4 is located between the tongue 1a' and the wall 1a of the channel 1 and so that the openings 5a, 5b in the lateral walls 1a, 1b of the channel 1 are in alignment with the bore 12 in the mounting head 3, and (d) the rivet 5 is inserted into the openings 5a, 5b in the channel 1 and into the bore 12 in the mounting head 3.

When the wiper arm according to the invention is assembled (FIG. 10) the extremity 4b of the helical spring 4 extends in the direction of the arm extension 2 and is substantially parallel to the longitudinal axis of the wiper arm.

Once the thus described wiper arm has been mounted onto a vehicle (FIG. 2) the channel 1, the arm extension 2 and the wiper blade (not shown) are pushed towards and onto the windshield of the vehicle. At this moment, because of the angle existing between the drive shaft 7, 7' and the windshield and because of the presence of the wiper blade, the channel 1 is somewhat lifted with respect to the portion 3a of the mounting head 3 and the recilinear extremity 4b of the spring 4 is somewhat lifted away from the stop 13 (FIG. 3) of the mounting head 3. When thus lifted the rectilinear extremity 4b exerts a pressure or load (torsion of the spring 4) on the wiper blade via the tongue 1a', the channel 1 and the arm extension 2.

In a wiper arm according to the invention the channel 1 is substantially shorter, and thus less voluminous and less heavy, than in an equivalent prior art wiper arm. Moreover, since the helical spring 4 does not act directly on the arm extension (as is generally the case in prior art wiper arms), the portion 1d of the channel 1 does no longer need to be riveted to the arm extension 2.

The way the portion 1d of the channel 1 is attached to the arm extension 2 is schematically shown on FIG. 9. The arm extension 2 comprises a stud 2' which enters into a corresponding opening in said portion 1d of the channel 1 and, as already said above, the lateral walls of the channel 1 surround the arm extension 2 in the area of the portion 1d of the channel 1 (FIG. 1 and 6).

As to the advantages of the wiper arm according to the invention, when compared to the wiper arms known in prior art, they may be summarized by: its simplicity, its compactness, its lightness and its low cost.

I claim:

1. A wiper arm for wiper blades of motor vehicles or the like comprising a channel (1), an arm extension (2), a mounting head (3) having a substantially annular recess (11), a helical torsion spring (4) and a rivet (5) acting as articulation means between the channel (1) and the mounting head (3), wherein the mounting head (3) is secured to a drive shaft (7, 7'), characterized in that means secure the mounting head (3) to the drive shaft (7, 7') in the area located between the arm extension (2) and the helical torsion spring (4), the helical torsion spring (4) is located in the annular recess (11) in the mounting head (3), and the geometrical axis of the annular recess (11) substantially coincides with the geometrical axis of the rivet (5).

2. A wiper arm according to claim 1, characterized in that the geometrical axis of the helical spring (4) is substantially coincident with the geometrical axis of the annular recess (11).

3. A wiper arm according to claim 1 or 2 characterized in that lock one of the extremities (4a) of the helical spring (4) (11') in the annular recess (11).

4. A wiper arm according to claim 3, characterized in that the other extremity (4b) of the helical spring (4) extends in the direction of the arm extension (2).

5. A wiper arm according to claim 4, characterized in that the channel (1) comprises a retention means (1a') capable of retaining the extremity (4b) of the helical spring(4) which extends in the direction of the arm extension (2).

6. A wiper arm according to claim 5 wherein the channel (1) comprises two lateral walls (1a, 1b) which are substantially parallel to the geometrical axis of the drive shaft (7, 7'), characterized in that said retention means is a tongue (1a') provided on one of said lateral walls (1a, 1b) of the channel (1).

* * * * *